United States Patent
McNew

(10) Patent No.: US 11,433,734 B2
(45) Date of Patent: Sep. 6, 2022

(54) AUTONOMOUS OPERATION OF VEHICLE VENTS

(71) Applicant: Toyota Motor Engineering & Manufacturing North America, Inc., Plano, TX (US)

(72) Inventor: John-Michael McNew, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 223 days.

(21) Appl. No.: 16/692,661

(22) Filed: Nov. 22, 2019

(65) Prior Publication Data

US 2021/0155070 A1     May 27, 2021

(51) Int. Cl.
    *B60H 1/00*     (2006.01)

(52) U.S. Cl.
CPC ....... *B60H 1/0073* (2019.05); *B60H 1/00742* (2013.01); *B60H 1/00778* (2013.01); *B60H 1/00835* (2013.01)

(58) Field of Classification Search
CPC .......... B60H 1/26; B60H 1/265; B60H 1/267; B60H 1/28; B60H 1/00864; B60H 1/00835; B60H 1/00857; B60H 1/00842
See application file for complete search history.

(56) References Cited

U.S. PATENT DOCUMENTS

| | | | | |
|---|---|---|---|---|
| 5,054,686 A | * | 10/1991 | Chuang | B60R 25/00 236/49.3 |
| 5,176,201 A | * | 1/1993 | Yamamoto | B60H 1/00021 165/202 |
| 5,320,577 A | * | 6/1994 | Tooru | B60H 1/008 454/139 |
| 5,878,809 A | * | 3/1999 | Heinle | B60H 1/0075 165/203 |
| 5,982,124 A | * | 11/1999 | Wang | G05B 13/024 318/286 |
| 9,440,603 B2 | | 9/2016 | Graham | |

(Continued)

FOREIGN PATENT DOCUMENTS

| | | | | |
|---|---|---|---|---|
| JP | 01164617 A | * | 6/1989 | ......... B60H 1/00864 |
| JP | 2001163050 A | * | 6/2001 | ............... B60H 1/00 |
| KR | 20130038906 A | | 4/2013 | |

Primary Examiner — Nelson J Nieves
(74) Attorney, Agent, or Firm — Christopher G. Darrow; Darrow Mustafa, PC

(57) ABSTRACT

A vent control system for a vehicle includes one or more processors and a memory communicably coupled to the one or more processors. The memory may store a vent control module including instructions that when executed by the one or more processors cause the one or more processors to autonomously control operation of a vehicle to open at least one vehicle vent when the vehicle is in a regular vent opening condition. Responsive to manual closure of the at least one vehicle vent within a predetermined time period after the at least one vehicle vent was autonomously opened, the regular opening condition may be updated to an updated regular opening condition. After updating the regular opening condition, operation of the vehicle may be autonomously controlled to open the at least one vehicle vent when the vehicle is subsequently in the updated regular opening condition.

10 Claims, 6 Drawing Sheets

(56) References Cited

U.S. PATENT DOCUMENTS

| | | | |
|---|---|---|---|
| 9,931,909 B2 | 4/2018 | McNew | |
| 9,969,244 B2* | 5/2018 | Hurd | B60H 1/00842 |
| 2002/0121557 A1* | 9/2002 | Kaneura | B60H 1/00735 |
| | | | 237/12.3 A |
| 2002/0143452 A1* | 10/2002 | Losey | E05F 15/71 |
| | | | 701/49 |
| 2006/0196652 A1* | 9/2006 | Nagayama | B60H 1/00835 |
| | | | 165/202 |
| 2007/0152615 A1* | 7/2007 | Newman | E05F 15/695 |
| | | | 318/481 |
| 2008/0046146 A1* | 2/2008 | Brekke | B60H 1/00742 |
| | | | 701/45 |
| 2011/0016899 A1* | 1/2011 | Ogura | B60H 1/00278 |
| | | | 62/239 |
| 2011/0114739 A1* | 5/2011 | Misumi | B60H 1/00742 |
| | | | 236/49.3 |
| 2012/0116608 A1* | 5/2012 | Park | H04W 4/44 |
| | | | 701/2 |
| 2013/0098090 A1* | 4/2013 | Mori | B60H 1/00778 |
| | | | 62/243 |
| 2013/0332013 A1* | 12/2013 | Malone | B60H 1/00764 |
| | | | 701/22 |
| 2014/0027090 A1* | 1/2014 | Morikawa | B60H 1/00021 |
| | | | 165/47 |
| 2016/0090773 A1* | 3/2016 | Wippler | E05F 15/70 |
| | | | 49/31 |
| 2017/0225541 A1* | 8/2017 | Shimoda | B60H 1/00821 |
| 2017/0368908 A1* | 12/2017 | Cervantes | B60H 1/00821 |
| 2018/0057012 A1* | 3/2018 | Delgado | B60W 50/0098 |
| 2018/0057013 A1* | 3/2018 | Mullett | B60H 1/267 |
| 2018/0194361 A1* | 7/2018 | Dudar | B60H 1/00764 |
| 2019/0126720 A1* | 5/2019 | Gomez Mata | B60H 1/00871 |
| 2019/0160907 A1* | 5/2019 | Velazquez | B60H 1/00028 |
| 2019/0248208 A1* | 8/2019 | Higashitani | B60W 10/04 |
| 2019/0322157 A1* | 10/2019 | Harris | B60J 7/043 |
| 2020/0062081 A1* | 2/2020 | Curry | B60H 1/00735 |
| 2020/0070627 A1* | 3/2020 | Sakai | B60J 9/00 |
| 2020/0171911 A1* | 6/2020 | Sawada | B60H 1/242 |
| 2020/0247214 A1* | 8/2020 | Takata | B60H 1/00742 |
| 2021/0158689 A1* | 5/2021 | Chapman | G08G 1/0955 |

* cited by examiner

You just closed the vents manually. Do you want the vents to be closed regularly at that location and heading?

YES

Please enter a length of time for which the vehicle vent(s) are to remain closed starting from the point in time when the vehicle vent(s) were manually closed.

| 1 | 2 | 3 | seconds |
| 4 | 5 | 6 | minutes |
| 7 | 8 | 9 | hours |
| 0 | | | |

FIG. 2B

Please enter a length of travel (including units) for which the vehicle vent(s) are to remain closed starting from a location of the vehicle when the vehicle vent(s) were manually closed.

| 1 | 2 | 3 |  feet  | meters |
| 4 | 5 | 6 | yards  | kilometers |
| 7 | 8 | 9 | miles  |
|   | 0 |   |

FIG. 2C

Is the vehicle reaching the end of the length of travel to be designated a regular opening condition?

YES

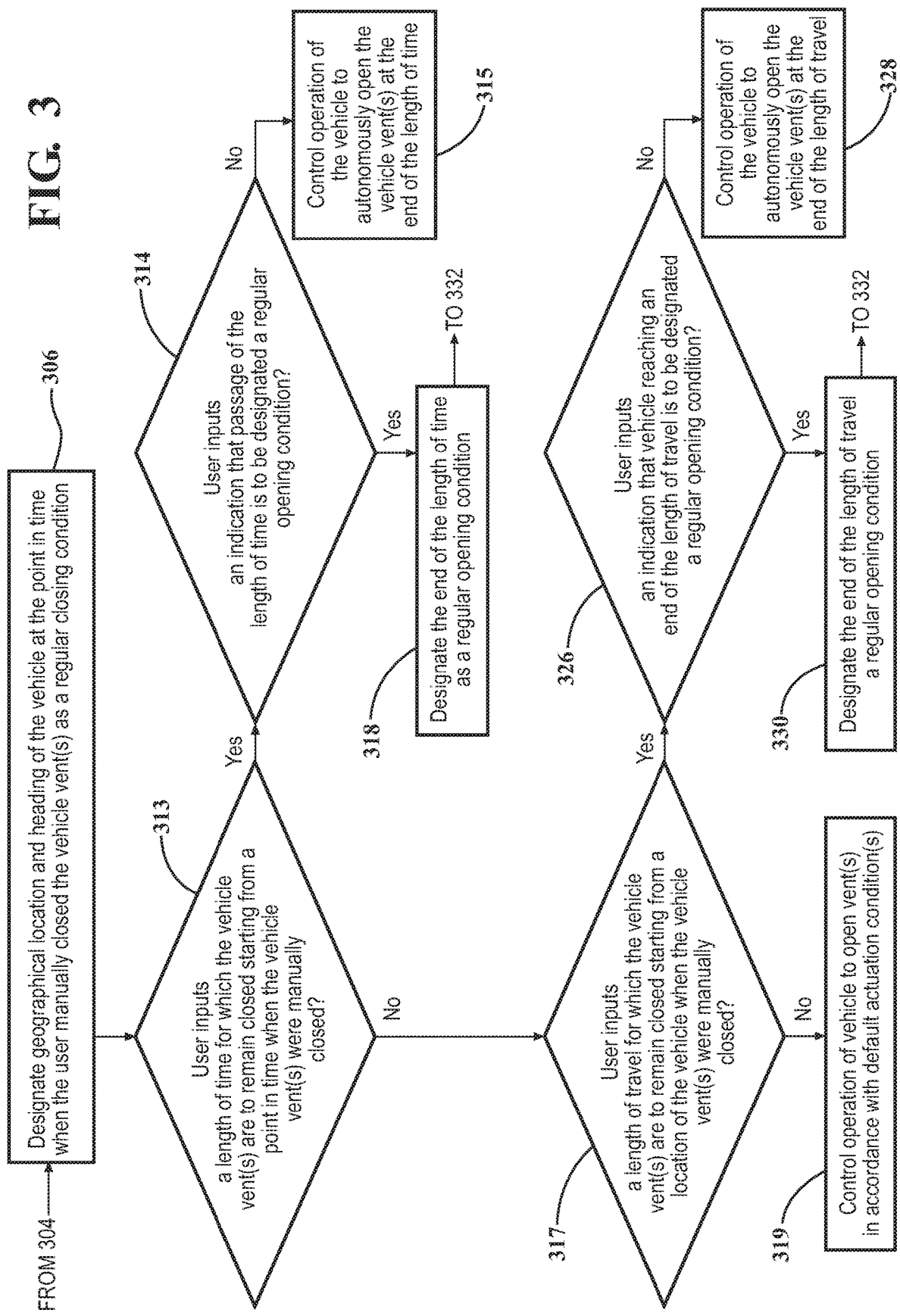

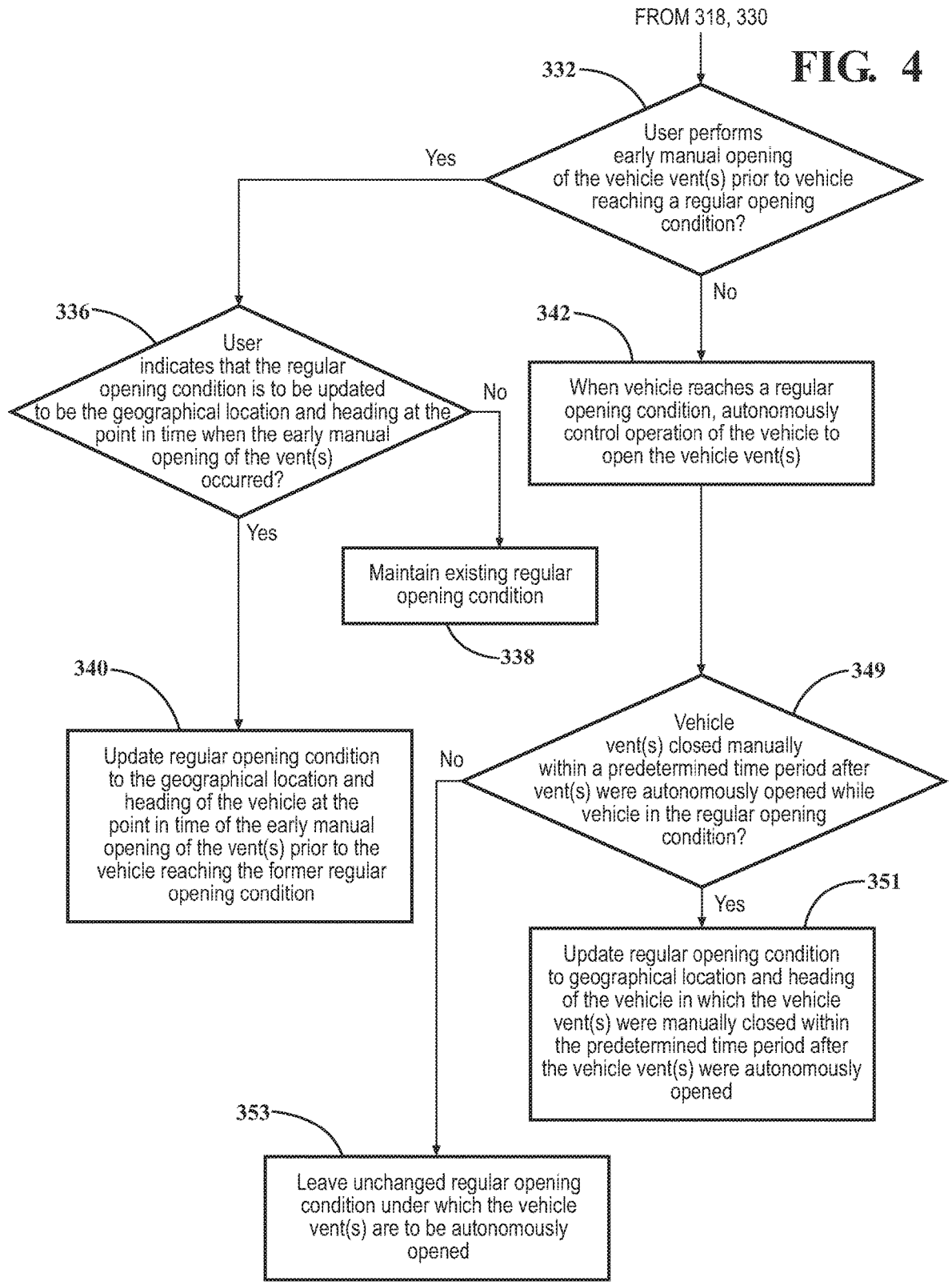

AUTONOMOUS OPERATION OF VEHICLE VENTS

TECHNICAL FIELD

The subject matter described herein relates, in general, to autonomous control of elements of a vehicle, and, more particularly, to autonomous control of the vehicle HVAC vents responsive to user-defined control criteria.

BACKGROUND

Vehicles may travel through areas permeated by unpleasant and/or noxious fumes. These fumes may enter the vehicle occupant compartment through open HVAC vents. If a vehicle occupant is aware of (or remembers) the locations of such areas, the occupant may manually close the vehicle vents prior to reaching these areas to prevent entry of fumes. However, the user may forget to close the vents even when a desired closing location is known. In addition, it may also be desirable to re-open the vehicle vents as soon as possible after an odorous area has been transited. The occupant may forget to open the vents at a location known to be outside the odorous area, or may forget the earliest location where the vents may safely be opened.

SUMMARY

In one aspect of the embodiments described herein, a vent control system for a vehicle is provided. The vent control system includes one or more processors and a memory communicably coupled to the one or more processors. The memory may store a vent control module including instructions that when executed by the one or more processors cause the one or more processors to autonomously control operation of a vehicle to open at least one vehicle vent when the vehicle is in a regular vent opening condition. Responsive to manual closure of the at least one vehicle vent within a predetermined time period after the at least one vehicle vent has been autonomously opened while the vehicle was in the regular vent opening condition, the regular opening condition may be updated to an updated regular opening condition including a geographical location and heading of the vehicle when the at least one vehicle vent was manually closed within the predetermined time period after the at least one vehicle vent was autonomously opened. After updating the regular opening condition, operation of the vehicle may be autonomously controlled to open the at least one vehicle vent when the vehicle is subsequently in the updated regular opening condition.

In another aspect of the embodiments described herein, a method for controlling HVAC vents in a vehicle is provided. The method includes a step of autonomously controlling operation of the vehicle to open at least one vehicle vent when the vehicle is in a user-specified vent opening condition.

In yet another aspect of the embodiments described herein, a method for controlling HVAC vents in a vehicle is provided. The method includes a step of autonomously controlling operation of the vehicle to close at least one vehicle vent when the vehicle is in a user-specified vent closing condition.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 2A is a schematic view of an example vehicle screen display including a prompt to a user, in accordance with one aspect described herein.

FIG. 2B is a schematic view of an example vehicle screen display including a prompt to a user, in accordance with another aspect described herein.

FIG. 2C is a schematic view of an example vehicle screen display including a prompt to a user, in accordance with another aspect described herein.

FIG. 3 is a flow diagram illustrating additional modes of establishing vehicle vent control parameters and controlling operation of one or more vehicle vents in accordance with user specified criteria.

FIG. 3A is a schematic view of an example vehicle screen display including a prompt to a user, in accordance with another aspect described herein.

FIG. 4 is a flow diagram illustrating modes of revising vehicle vent control parameters and controlling operation of one or more vehicle vents in accordance with revised user specified criteria.

DETAILED DESCRIPTION

Embodiments described herein relate to autonomous control of one or more vehicle vents. Vent control parameters may be established by a user to enable autonomous control of the vent(s). Specifically, a vehicle occupant or other user may set conditions under which vehicle vent(s) may be autonomously closed and/or opened. For example, a user may close vent(s) manually and establish a location and heading of the vehicle when the vent(s) were closed as a regular closing condition. Subsequently, a vent control module of the vehicle may operate to autonomously close the vent(s) whenever the vehicle is in the regular closing condition (i.e., whenever the vehicle is at the specified location and oriented in the specified heading). The user may also specify conditions under which the vent(s) will be autonomously opened. For example, the user may specify that the vents are to be opened after passage of a specified time period after the vents were closed. Alternatively, the user may specify that the vents are to be opened after the vehicle has traveled a specified distance after the vents were closed. The user may designate regular opening conditions for the vent(s) under which the vent(s) will be autonomously opened. The user may also change the conditions under which the vent(s) will be autonomously opened. In addition, the vent control module may autonomously change the conditions under which the vent(s) will be autonomously opened, responsive to user actions.

Figure 1:
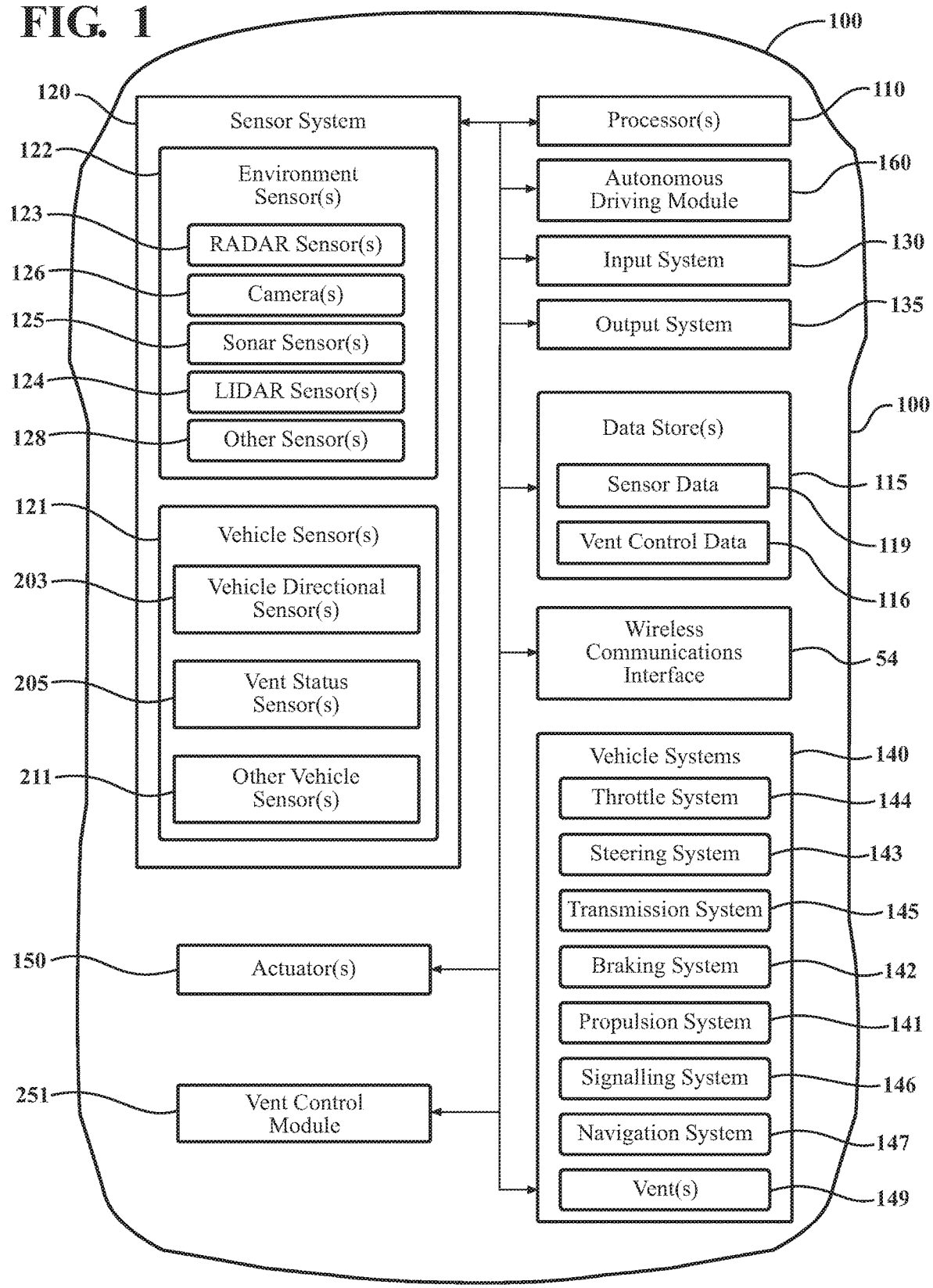
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, emits exhaust or gaseous emissions during operation of the vehicle, and thus benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

FIG. 1 is a block schematic diagram of a vehicle 100 incorporating a system for controlling HVAC vents (collectively designated 149) in accordance with an embodiment described herein. A "vent" or a "vehicle vent" as described herein includes any mechanism actuatable to enable and/or prevent a flow of air of other gases from outside a vehicle into an occupant cmpartment of the vehicle. The vehicle vent(s) 149 described herein may be controllable either manually or autonomously by commnads generated by an element and/or system of the vehicle 100. In embodiments described herein, at least one vehicle vent may be opened and/or closed manually or autonomously under conditions described herein. For example, vent(s) facing only in a forward direction of the vehicle may be controlled, or a single vent may be controlled if one or more other vent(s) are disabled or malfunctioning. In one or more embodiments, all of the vehicle vents may be controlled to open at the same time and/or close at the same time, responsive to a control signal. Opening or closing of all of the vents at the same time refers to the response of the vents to a control signal (or signals) intended to open or close all of the vents simultaneously, but where the actual point in time at which an individual vent opens or closes may be subject to the response time of the individual vent to the control signal(s).

Manual actuation (i.e., manual closing and manual opening) of the vehicle vent(s) is considered to have occurred when a vehicle occupant causes the vent(s) to open or close in real time, while the occupant is traveling in the vehicle. The vehicle vent(s) 149 may be actuated manually in any of a variety of ways, depending on vehicle features and capabilities and occupant preferences. For example, input system 130 (described in greater detail below) may incorporate a voice command interface capable of receiving and interpreting occupant voice commands to open the vent(s), close the vent(s), store a time period at the end of which the vent(s) are to be autonomously opened or closed, store a vehicle length of travel at the end of which the vent(s) are to be autonomously opened or closed, and/or other commands and vent-related parameter values. The input system 130 may also be configured to enable commands and parameter values related to opening and closing of the vehicle vent(s) to be entered by touch screen, push-buttons, cellular device (for example, a cellular device of a non-driving vehicle occupant), or by any other suitable means. The vent control module 251 (described herein) may include instructions that when executed by the one or more processors cause the one or more processors to receive, interpret, execute, store, and/or otherwise process vent-related commands and vent-related parameters entered by a vehicle occupant.

In some instances, the vehicle 100 may be configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. "Autonomous mode" may also refer to autonomous operations of the vehicle in controlling opening and closing of vehicle vent(s) 149.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include vent control data 116. The vent control data 116 may include information such as times of occurrences of vent-related events (such as vent opening and/or closings), geographical locations (for example in the form of geographical coordinates, such as GPS coordinates), associated vehicle headings, and any other parameters usable for characterizing a condition of the vehicle in which a vent-related event is to occur. Elements of the vent control data 116 may be recorded, cross-correlated and/or otherwise processed to associate geographical locations, vehicle headings, and vent statuses as described herein for purposes of controlling opening and closing of the vehicle vent(s) 149.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the vent control data 116 and/or the sensor data 119 can be located in one or more data stores 115 located onboard the vehicle 100. Alternatively, or in addition, at least a portion of the vent control data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby objects).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100, such as the current geographical location of the vehicle. In one or more arrangements, the vehicle sensor(s) 121 can include a speedometer to determine a current speed of the vehicle 100. The vehicle sensor(s) 121 may include vent status sensors 205 configured for detecting a current status (i.e., closed or open) of one or more of the vehicle vent(s) 149. The vehicle sensor(s) 121 may include vehicle directional sensors 203 configured to determine a current heading of the vehicle or direction in which the vehicle is pointed.

In addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 are described herein. The example sensors may be part of the one or more environment sensors 122 and/or the one or more vehicle sensors 121. However, it will be understood that the embodiments are not limited to the particular sensors described. The sensor system 120 may include any sensors suitable for and/or required to perform any of the vent control operations contemplated herein.

As an example, in one or more arrangements, the environment sensors 122 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. For example, the input system 130 may include a keypad, a touch screen or other interactive display, a voice-recognition system and/or any other device or system which facilitates communications between a user and the vehicle. The input system 130 can receive an input from a vehicle passenger (e.g., a driver or a passenger) or a user located remotely from the vehicle 100. The vehicle 100 can also include an output system 135. An "output system" includes any device, component, or arrangement or groups thereof that enable information/data to be presented to a vehicle passenger (e.g., a person, a vehicle passenger, etc.) or a remote user.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the vent control module 251, the exhaust module 253, and the vent control module 251 and/or the autonomous driving module(s) 160 can be operably connected to communicate with the other elements of the vehicle, including various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140 and, thus, may be partially or fully autonomous.

The processor(s) 110 and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities. For example, certain of actuators 150 may be operably coupled to the vehicle vent(s) and to other portions of the vehicle (such as processors 110) and may be operable to autonomously open and/or close the vent(s) 149 responsive to a control command. Certain actuators may be operable to open and/or close the vehicle vents 149 (either autonomously or in response to manual action).

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more of data store(s) 115 may contain such instructions.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120 and/or information received from a navigation system, such as navigation system 147. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

The vehicle 100 can include a vent control module 251. In one or more embodiments, the vent control module 251 may include computer-readable instructions that, when executed by the processors 110, cause the processors to receive pertinent information, process vent-related parameters and perform the various determinations and vent control functions disclosed herein. The vent control module 251 may cause the processors to interact with other vehicle components and systems to monitor and store various conditions of the vehicle usable for determining when the vehicle vent(s) are to be autonomously actuated (i.e., opened and closed). The vent control module 251 may cause the processors to interact with other vehicle components and systems to receive and interpret pertinent information from a vehicle occupant or user and to use this information to determine conditions of the vehicle in which the vent(s) are to be autonomously actuated. The vent control module 251 may cause the processors to determine that certain conditions of the vehicle are to be designated opening conditions or closing conditions (including regular opening conditions and regular closing conditions), and to designate certain conditions of the vehicle as opening conditions or closing conditions as described herein. The vent control module 251 may cause the processors to interact with other vehicle components and systems to open and/or close the vent(s) when the vehicle 100 is in a vehicle condition designated for vent opening or vent closing.

For the purposes described herein, a "vent actuation condition" or "actuation condition" may be defined as including values of one or more parameters that describe when the vehicle vent(s) either were actuated or are intended to be actuated (i.e., opened or closed) autonomously. Types of vent actuation conditions may include at least a "vent opening condition", a "regular vent opening condition", a "vent closing condition", and a "regular vent closing condition". A "vent opening condition" may define circumstances under which the vehicle vent(s) are to be opened autonomously on a one-time basis. A "vent closing condition" may define circumstances under which the vehicle vent(s) are to be closed autonomously on a one-time basis. A "regular vent opening condition" or "regular opening condition" may define circumstances under which the vehicle vent(s) are to be opened autonomously whenever the circumstances occur. Similarly, a "regular vent closing condition" or "regular closing condition" may define circumstances under which when the vehicle vent(s) are to be closed autonomously whenever the circumstances occur.

In one or more arrangements, the parameters characterizing a vent actuation condition may include a physical, geographical location of the vehicle and an associated direction in which the vehicle is to be heading when the vehicle reaches the specified geographical location. Thus, in one example, when a regular opening condition is specified by a user or vehicle occupant and stored in memory, the vehicle vent(s) may be autonomously actuated to open the vent(s) whenever the vehicle (1) is determined to be at the specified geographical location, and (2) is determined to be heading (i.e., facing and/or moving) in the direction associated with the specified geographical location. The parameters characterizing the vent actuation conditions may also (or alternatively) include other parameters or variables.

In one or more arrangements, unless otherwise specified by a user, the parameters used to define the actuation condition may be the geographical location of the vehicle at a given point in time, and an associated heading or direction of the vehicle at the given point in time. The given point in time may be a point in time when the vent(s) were manually closed or manually opened. The direction or heading associated with the specified geographical location may be stored in any form suitable for indicating a direction in which the vehicle is facing or moving when the vehicle is at the specified geographical location. This arrangement enables a user to, for example, specify a location along a travel route at which the vent(s) will automatically open whenever the vehicle reaches the specified geographical location and is moving in a direction associated with the geographical location (i.e., the vent(s) may be autonomously opened at the same point along a route every time the route is traveled, when the vehicle is traveling in the same direction along the route).

Storing a directional component as well as a location for vent actuation enables the vent(s) to be autonomously operated when the vehicle is at a specific location and entering an area where the occupant wishes the vent(s) to be closed, while also enabling the vent(s) to be autonomously opened when the vehicle is at the same specific location, but exiting the area where the occupant wishes the vent(s) to be closed (i.e., when the vehicle has a different heading). Thus, the same geographical location may be specified for both closing the vent(s) and opening the vent(s) when traveling in opposite directions. The associated direction or heading of the vehicle may have a tolerance associated therewith, to account for slight variations in vehicle heading when the vehicle is at an associated geographical location. In one or more embodiments, the tolerance may be an angular tolerance (for example, ±5 degrees). Thus, for example, when the vehicle is traveling on a bearing of 45 degrees (in a directional system using 0 degrees as straight North, 90 degrees as straight East, 180 degrees as straight South, and 270 degrees as straight West), the vent(s) may be automatically actuated when the vehicle is at the associated geographical location and the vehicle has a bearing of between 40 degrees and 50 degrees. The geographical location of the vehicle may also have a tolerance associated therewith. The tolerance may depend on a precision of the navigation system in detecting the vehicle's position, and other factors.

A user may have a predetermined time period after vent(s) have been manually closed and/or opened in which to enter information usable in determining conditions for autonomous vent actuation. Also, default actuation conditions may be stored in a memory (such as data stores 115) for use in the absence of user input sufficient to determine specific conditions for autonomous vent actuation.

The vent control module 251 may enable conditions for vent actuation to be updated or otherwise modified based on actions of the user, such as manual opening or closing of the vent(s). In certain embodiments a user may be queried for information, such as confirmation that a regular opening or closing condition is to be updated or otherwise modified.

The parameters used to define an actuation condition may also include an elapsed period of time specified by the user, at the end of which the vent(s) may be actuated. The parameters used to define an actuation condition may also include a length of travel (for example, a number of miles entered by the user) starting from where the vehicle resides when the vent(s) are actuated either manually or autonomously. The vent control module 251 may then autonomously cause actuation of the vent(s) after the vehicle has traveled the specified length of travel. Other parameters may also be used in determining vent actuation conditions.

Operation of the vent control system will now be discussed with reference to FIGS. 1-4.

Figure 2:
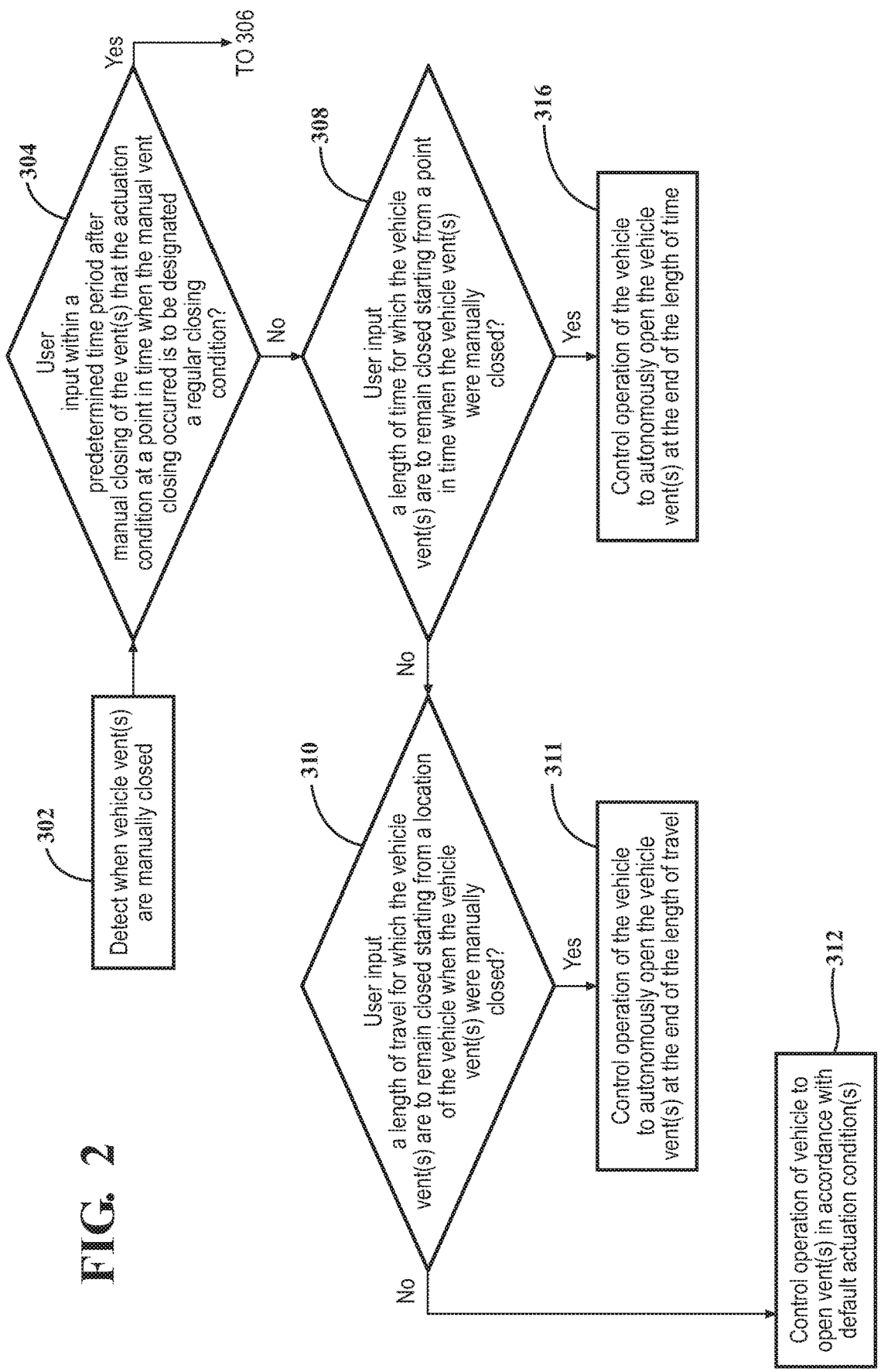
FIG. 2 is a flow diagram illustrating modes of establishing vehicle vent control parameters and controlling operation of one or more vehicle vents in accordance with user specified criteria.

The vent control module 251 may include instructions that when executed by the processor(s) 110 cause the processor(s) to operate (if necessary, in conjunction with other portions of the vehicle 100) to perform the determinations and execute the steps shown in FIGS. 2-4. The sensor system 120 may be configured to constantly track and store to a memory the current vehicle geographical location, heading, vent status and other vehicle parameters as the vehicle moves. Concurrent values of these parameters may be associated with each other as previously described. If needed, a clock or timer (not shown) may begin to run as soon as the engine is turned on. Times from the timer may be used to record elapsed lengths of time with respect to how long the engine has been on, vent opening and closings, and any other time-related parameters. If the engine is shut off, the timer may be stopped and reset to zero.

In one or more applications of the vent control system, the system may enable a user to specify that the vehicle vent(s) will be either autonomously closed or autonomously opened whenever the vehicle is in a user-defined actuation condition. For example, on a route traveled every day by the user, the vehicle may pass through a geographical area in which objectionable odors may enter the vehicle due to the presence of a manufacturing facility. The user may specify a first actuation condition in which the vehicle vent(s) are to be autonomously closed (i.e., a closing condition). The first actuation condition may include a first geographical location and an associated direction or heading in which the vehicle is moving when the vehicle reaches the first geographical location. The first actuation condition may occur at a location along the route which the vehicle may reach prior to reaching an area where the objectionable odors are encountered. The user may additionally specify that the vent(s) are to be autonomously closed whenever the vehicle is in the first actuation condition (i.e., the parameter values describing first actuation condition may be designated a "regular closing condition").

Similarly, the user may specify a second actuation condition in which the vehicle vent(s) are to be autonomously opened (i.e., an opening condition). The second actuation condition may include a second geographical location and an associated direction or heading in which the vehicle is headed when the vehicle reaches the second geographical location. The second actuation condition may occur at a location along the route which the vehicle may reach after passing through the area where the objectionable odors are found. The user may additionally specify that the vent(s) are to be autonomously opened whenever the vehicle is in the second actuation condition (i.e., the parameter values describing the second actuation condition may be designated a "regular opening condition").

Referring to FIG. 2, in block 302, vent status sensors 205 may detect when a user manually closes the vehicle vent(s) 149. Manual closure of the vent(s) may start a timer (not shown) configured to track how long the vent(s) have been closed after manual closing. In addition, values of parameters such as the vehicle geographical location and heading and other parameters when the vent(s) were manually closed may be logged or flagged for reference.

In 304, the user may be queried and given a predetermined time period after manual closing of the vent(s) to input additional information for defining an actuation condition under which the vent(s) are to be actuated. The time periods for responses described herein may be selectable and/or modifiable by a user. The time period may be, for example, 10 seconds or any other desired amount of time.

In any circumstance where input or feedback from a user is to be elicited and/or received, the user may be notified of the need to input additional information in a manner preselected by the user. The user may choose notification by audio prompt, by presentation of a menu on a vehicle display screen, by a combination of these methods, or by any other suitable method enabled by the vehicle. For example, after manual closure of the vents has been detected in block 302, the vent control module 251 may query the user "You just closed the vents manually. Do you want the vents to be closed regularly at that location and heading?" A positive response to this query by the user may establish the actuation condition (i.e., vehicle location and heading) at the time of manual vent closing as a regular closing condition. The query may be displayed on a touch screen as shown in FIG. 2A. The user may reply by touching the screen or by spoken response. In addition, the term "input" as used herein encompasses any method of specifying or entering a parameter value and/or conveying a command, instruction, and/or other information to the vent control module 251. Input methods may include voice command, touch screen, pushbutton, and/or any other information communication method suitable for the purposes described herein. The particular method of information input may be pre-specified or pre-selected by the user from a plurality of options.

In block 304, the vent control module 251 may query the user in the pre-selected manner or in a default manner. The user may respond by inputting (in a pre-selected manner) an indication that the geographical location and heading of the vehicle at a point in time when the manual vent closing occurred are meant to define a regular closing condition. The vent control module 251 may include instructions that when executed by the processor(s) 110 enable the processor(s) to (in 304) receive an indication or instruction within the predetermined time period after manual closing of the vent(s) that the geographical location and heading of the vehicle at a point in time when the manual vent closing occurred are to define a regular closing condition. If such an indication is input by a user, the combination of the location and heading of the vehicle at the point in time when the manual vent closing occurred may be flagged as or designated (in 306, FIG. 3) a regular closing condition by the vent control module 251. Thus, while this actuation condition is designated a regular closing condition, the vent(s) may automatically close whenever the vehicle reaches the geographical location associated with the actuation condition, provided that the vehicle is facing or headed in the direction associated with the actuation condition. The vent control module 251 may determine (in block 304) if the user has input a response to the query of block 304, and the nature of the response.

Returning to block 304, if the user does not input (within the predetermined time period after manual closing of the vent(s)) that the geographical location and heading of the vehicle at the point in time when the manual vent closing occurred is to be a regular closing condition, the vent control module 251 may (in block 308) query the user to input a length of time for which the vehicle vent(s) are to remain closed starting from the point in time when the vehicle vent(s) were manually closed. For example, the vent control module 251 may cause a message to be displayed on a display screen to "Please enter a length of time for which the vehicle vent(s) are to remain closed starting from the point in time when the vehicle vent(s) were manually closed." In one example, the message may be displayed in the manner shown in FIG. 2B. The vent control module 251 may also (or alternatively) cause an audio prompt containing this message to be generated. The user may then be given an additional, second predetermined time period after presentation of the query to input a length of time for which the vehicle vent(s) are to remain closed starting from the point in time when the vehicle vent(s) were manually closed. The vent control module 251 may include instructions that when executed by the processors 110 enable the processors to (in 308) receive input of a length of time for which the vehicle vent(s) are to remain closed starting from the point in time when the vehicle vent(s) were manually closed. The vent control module 251 may determine (in block 308) if the user has input a response to the query of block 308, and the nature of the response.

If the vent control module 251 determines (in 308) that the user has input (within the predetermined time period after presentation of the query of block 308) a length of time for which the vehicle vent(s) are to remain closed starting from a point in time when the vehicle vent(s) were manually closed, control may pass to block 316, where the vent control module 251 may control and/or coordinate operation of the vehicle systems and elements to autonomously open the vehicle vent(s) 149 at the end of the designated length of time. This capability enables the user to instruct autonomous re-opening of the vent(s) after passage of a specified amount of time after manual closing.

However, if it is determined that the user did not input a length of time for which the vehicle vent(s) are to remain closed starting from the point in time when the vehicle vent(s) were manually closed, the vent control module 251 may (in block 310) query the user to input a length of travel for which the vehicle vent(s) are to remain closed starting from a location of the vehicle when the vehicle vent(s) were manually closed. For example, the vent control module 251 may cause a message to be displayed on a display screen to "Please enter a length of travel (including units) for which the vehicle vent(s) are to remain closed starting from a location of the vehicle when the vehicle vent(s) were manually closed." The message may be displayed in the manner shown in FIG. 2C. The vent control module 251 may also (or alternatively) cause an audio prompt containing this message to be generated. The user may then be given an additional, third predetermined time period after presentation of this query to input a length of travel for which the vehicle vent(s) are to remain closed starting from a location of the vehicle when the vehicle vent(s) were manually closed. The length of travel may be a distance that the vehicle 100 is to travel before the vents are automatically opened. The length of travel may be input by voice or touchscreen in any desired units (for example, miles, feet, kilometers, etc.). The length of travel may be specified as, for example, "100 yards", "the next 20 miles", or any other desired driving distance from the location at which the vent(s) were manually closed. The particular format for input of the length of travel may be selectable and modifiable by the user. This capability enables the user to instruct autonomous re-opening of the vent(s) after the vehicle has traveled the length of travel from a geographical location of the vehicle when the vehicle vent(s) were manually closed. The vent control module 251 may include instructions that when executed by the processors 110 enable the processors to (in 310) receive input of a length of travel for which the vehicle vent(s) are to remain closed starting from the point in time when the vehicle vent(s) were manually closed. The vent control module 251 may determine (in block 310) if the user has input a response to the query of block 310, and the nature of the response.

For implementation of blocks 304, 308, and 310, any inputs by the user may be buffered and processed to determine if the input comprises a length of time, a length of travel, or an indication that the actuation condition (for example, geographical location and heading) of the vehicle at the time of manual closing is to be designated a regular closing location. Any ambiguity in interpreting the input(s) may be resolved by querying the user to elicit a confirmation or repetition of the input, or by any other suitable means.

If the user inputs, within the third predetermined time period, a length of travel for which the vehicle vent(s) 149 are to remain closed, control may pass to block 311 where the vent control module 251 may control operation of the vehicle to autonomously open the vehicle vent(s) 149 at the end of the length of travel.

However, if the user did not input a length of travel for which the vehicle vent(s) are to remain closed starting from a location of the vehicle when the vehicle vent(s) were manually closed, the vent(s) may be (in 312) controlled to open according to default actuation condition(s). The default condition(s) may be set by the vehicle manufacturer or another entity, and may be configured to be changeable by the user. In non-exclusive examples, the vent(s) may be controlled to open by default 30 seconds after being manually closed, or after the vehicle has traveled a distance of ½ mile after the vent(s) were manually closed. This may be suitable in a case where, for example, the vehicle is passing through an area where a skunk has been run over by a previous vehicle. Such cases may require only a relatively short-term closure of the vent(s) 149.

FIG. 3 illustrates one embodiment of a method of controlling the vent(s) 149 if the actuation condition under which the vent(s) were closed in block 304 (FIG. 2) is designated by the user to be a regular closing condition.

Referring again to block 304, following input by the user indicating the actuation condition from block 302 is a regular closing condition, the vent control module 251 may (in block 306) designate the geographical location and heading of the vehicle at the point in time when the user manually closed the vehicle vent(s) as a regular closing condition. The vent control module 251 may then (in 313, a step similar to block 308 (FIG. 2)) determine if the user inputs, within the predetermined time period after manual closing of the vent(s), a length of time for which the vehicle vent(s) are to remain closed starting from a point in time when the vehicle vent(s) were manually closed. The vent control module 251 may (in block 313) query the user to input a length of time for which the vehicle vent(s) are to remain closed starting from the point in time when the vehicle vent(s) were manually closed. For example, the vent control module 251 may cause a message to be displayed on a display screen to "Please enter a length of time for which the vehicle vent(s) are to remain closed starting from the point in time when the vehicle vent(s) were manually closed." In one example, the message may be displayed in the manner shown in FIG. 2B. The vent control module 251 may also (or alternatively) cause an audio prompt containing this message to be generated. The user may then be given a predetermined time period after presentation of the query to input a length of time for which the vehicle vent(s) are to remain closed starting from the point in time when the vehicle vent(s) were manually closed. The vent control module 251 may determine (in block 313) if the user has input a response to the query of block 313, and the nature of the response.

If the user inputs a length of time for which the vehicle vent(s) are to remain closed, the vent control module 251 may (in 314) query the user as to whether passage of the specified length of time is to be designated a regular opening condition. The vent control module 251 may include instructions that when executed by the processor(s) 110 enable the processor(s) to (in 314) receive an indication or instruction within the predetermined time period after manual closing of the vent(s) that the passage of the specified length of time is to be designated a regular opening condition. If such an indication is input by a user, the specified length of time the vents are to remain closed may be associated with the combination of the location and heading of the vehicle at the point in time when the manual vent closing occurred, and the specified length of time the vents are to remain closed may be flagged or designated as a regular opening condition by the vent control module 251. Thus, while this actuation condition is designated a regular opening condition, the vent(s) may automatically open whenever the vehicle has traveled for the specified time period from the location and heading of the vehicle at the point in time when the manual vent closing occurred. The vent control module 251 may determine (in block 314) if the user has input a response to the query of block 314, and the nature of the response.

If the user does not (in block 314) input an indication that passage of the length of time is to be designated a regular opening condition, the vent control module 251 may (in 315) control operation of the vehicle to autonomously open the vehicle vent(s) at the end of the length of time. However, if the user inputs an indication that passage of the length of time is to be designated a regular opening condition, the vent control module may (in 318) designate the end of the length of time as a regular opening condition. In this case, the vent(s) will automatically close whenever the vehicle is in the regular closing condition specified in block 314, and the vent(s) will automatically open whenever the vehicle is in the regular opening condition (i.e., at the end of the length of time) specified in block 318. After designation of the end of the length of time as a regular opening condition, control may proceed to block 322 (FIG. 4).

Returning to block 313, if the user does not input a length of time for which the vehicle vent(s) are to remain closed, the vent control module may (in 317, a step similar to block 310 of FIG. 2) query the user to input a length of travel for which the vehicle vent(s) are to remain closed starting from a location of the vehicle when the vehicle vent(s) were manually closed. For example, the vent control module 251 may cause a message to be displayed on a display screen to "Please enter a length of travel (including units) for which the vehicle vent(s) are to remain closed starting from a location of the vehicle when the vehicle vent(s) were manually closed." The message may be displayed in the manner shown in FIG. 2C. The vent control module 251 may also (or alternatively) cause an audio prompt containing this message to be generated. The user may then be given an additional predetermined time period after this query to input a length of travel for which the vehicle vent(s) are to remain closed starting from a location of the vehicle when the vehicle vent(s) were manually closed. The length of travel may be a distance that the vehicle 100 is to travel before the vents are automatically opened. The length of travel may be input by voice or touchscreen in any desired units (for example, miles, feet, kilometers, etc.). The length of travel may be specified as, for example, "100 yards", "the next 20 miles", or any other desired driving distance from the location at which the vent(s) were manually closed. The particular format for input of the length of travel may be selectable and modifiable by the user. This capability enables the user to instruct autonomous re-opening of the vent(s) after the vehicle has traveled the length of travel from a geographical location of the vehicle when the vehicle vent(s) were manually closed. The vent control module 251 may determine (in block 317) if the user has input a response to the query of block 317, and the nature of the response.

If the user does not input (in block 317) a length of travel for which the vehicle vent(s) are to remain closed, the vent control module 251 may (in 319) control operation of the vehicle to open the vent(s) in accordance with default actuation condition(s), as previously described with regard to block 312. However, if the user inputs a length of travel for which the vehicle vent(s) are to remain closed, the vent control module may (in 326) query the user as to whether the vehicle reaching the end of the length of travel is to be designated a regular opening condition. As previously described, the query may be presented in a screen display (as shown in FIG. 3A, for example), by audio prompt, or any other suitable method. The vent control module 251 may include instructions that when executed by the processor(s) 110 enable the processor(s) to (in 326) receive an indication or instruction that the vehicle reaching the end of the length of travel is to be designated a regular opening condition. If such an indication is input by a user, the specified travel distance over which the vents are to remain closed may be associated with the combination of the location and heading of the vehicle at the point in time when the manual vent closing occurred, and the traveling of the specified travel distance by the vehicle may be flagged or designated as a regular opening condition by the vent control module 251. Thus, while this actuation condition is designated a regular opening condition, the vent(s) may automatically open whenever the vehicle has traveled the specified travel distance or length from the location at which the manual vent closing occurred. The vent control module 251 may determine (in block 326) if the user has input a response to the query of block 326, and the nature of the response.

If the user does not input an indication that an end of the length of travel is to be designated a regular opening condition, the vent control module 251 may (in 328) control operation of the vehicle to autonomously open the vehicle vent(s) at the end of the length of travel. However, if the user inputs an indication that an end of the length of travel is to be designated a regular opening condition, the vent control module may (in 330) designate the end of the length of travel a regular opening condition. In such a case, the vent(s) will automatically close whenever the vehicle is in the regular closing condition specified in block 314, and the vent(s) will automatically open whenever the vehicle is in the regular opening condition (i.e., at the end of the length of travel) specified in block 330. After designation of the vehicle reaching the end of the length of travel as a regular opening condition in 330, control may proceed to block 322 (FIG. 4).

Referring now to FIG. 4, the vent control module may detect (in 332) if the user performs early manual opening of the vehicle vent(s) prior to vehicle reaching a regular opening condition that has been saved in a memory.

If the user performs early manual opening of the vehicle vent(s) prior to vehicle reaching a regular opening condition, the vent control module 251 may (in 336) query the user (in a manner previously described, for example, with respect to FIG. 2A or 3A) regarding whether the regular opening condition is to be updated to be the geographical location and heading of the vehicle at the point in time when the early manual opening of the vent(s) occurred. The user may then be given a predetermined time period after this query to respond (for example, by indicating "YES" or "NO") as to whether the regular opening condition is to be updated to be the geographical location and heading of the vehicle at the point in time when the early manual opening of the vent(s) occurred. The vent control module 251 may also determine (in block 336) if the user has input a response to the query, and the nature of the response.

If, in response to the query in block 336, the user has indicated that the regular opening condition is to be updated to be the geographical location and heading of the vehicle 100 at the point in time when the early manual opening of the vent(s) occurred, the vent control module may (in 340) update the regular opening condition to the geographical location and heading of the vehicle at a point in time of the early manual opening of the vent(s) prior to the vehicle reaching the former regular opening condition. If, however, the user indicates that the regular opening condition is not to be updated to be the geographical location and heading of the vehicle 100 at the point in time when the early manual opening of the vent(s) occurred, the vent control module 251 may (in 338) maintain the existing regular opening condition.

Returning to block 332, if the user does not perform early manual opening of the vehicle vent(s) prior to vehicle reaching a regular opening condition, the vent control module may (in 342), when vehicle reaches a regular opening condition, autonomously control operation of the vehicle to open the vehicle vent(s) 149. The vent control module may then (in 349) detect if the vehicle vent(s) are closed manually by a user within a predetermined time period after the vent(s) were autonomously opened while the vehicle was in the regular opening condition. Manual closure of the vent(s) within a relatively short time period after automatic opening may indicate that the user believes that the vent(s) were opened too early, for example, because fumes or odors begin to seep into the vehicle occupant compartment after the vent(s) are autonomously opened. The predetermined time period after the vents were manually opened may be long enough to enable a user to detect objectionable odors entering the vehicle occupant compartment through the open vent(s), and to react to the odors by closing the vent(s). In one or more arrangements, the predetermined time period may be specified by a user by voice command, via a touch-screen menu, or by any other suitable method. If the predetermined time period expires without the vent(s) being manually closed after the vent(s) have been autonomously opened, the opening condition where the vehicle vent(s) are to be autonomously opened may be assumed to be sufficient, and may not be modified (block 353).

If the vehicle vent(s) were closed manually by a user within a predetermined time period after vent(s) were autonomously opened when the vehicle reached the regular opening condition, it is assumed that the vent(s) were opened autonomously too early, and that the regular opening condition should be revised so that the autonomous regular opening is deferred. Thus, the vent control module 251 may (in 351) update the regular opening condition to be the geographical location and heading of the vehicle in which the vehicle vent(s) were manually closed by the user within the predetermined time period after the vehicle vent(s) were autonomously opened. This revises the regular opening condition so that the vent(s) are autonomously opened at a later time than the vent(s) would be opened in the initial regular opening condition. Then, when the vehicle reaches the revised regular opening condition in the future, the vent(s) will autonomously open at the later point in time. This process may be repeated during successive trips where the regular opening condition is reached, with the regular opening condition being revised with each trip until the user does not close the vent(s) manually after an autonomous opening of the vent(s). At this point, the regular opening condition becomes fixed as the desired autonomous opening condition of the user.

Returning to block 349, if the vehicle vent(s) were not closed manually by a user within a predetermined time period after vent(s) were autonomously opened while the vehicle was in the regular opening condition, the vent control module may (in 353) leave unchanged the regular opening condition under which the vehicle vent(s) are to be autonomously opened. In this condition, it is assumed that the existing regular opening condition results in opening of the vent(s) under conditions in which, for example, an odorous region has been passed by the vehicle.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method for controlling HVAC vents in a vehicle, the method comprising a step of autonomously controlling operation of the vehicle to open at least one vehicle vent responsive to the vehicle being in a user-specified vent opening condition in which the vehicle has reached an end of a user-specified length of travel, the length of travel being measured from a location of the vehicle at a point in time when the at least one vehicle vent was last closed.

2. The method of claim 1 further comprising the step of, prior to autonomously controlling operation of the vehicle to open the at least one vehicle vent, detecting a manual closing of the at least one vehicle vent at the point in time.

3. The method of claim 1 further comprising the step of, prior to autonomously controlling operation of the vehicle to open the at least one vehicle vent, autonomously closing the at least one vehicle vent at the point in time.

4. The method of claim 1 further comprising a step of autonomously revising the user-specified vent opening condition responsive to a user manually closing the at least one vehicle vent within a predetermined time period after the at least one vehicle vent was opened by autonomous control of the vehicle.

5. The method of claim 1 further comprising a step of autonomously revising the user-specified vent opening condition responsive to a user manually opening the at least one vehicle vent prior to the vehicle being in the user-specified vent opening condition.

6. The method of claim 1 wherein the user-specified vent opening condition is a regular opening condition.

7. A method for controlling HVAC vents in a vehicle, the method comprising a step of autonomously controlling operation of the vehicle to open at least one vehicle vent responsive to the vehicle being in a user-specified vent opening condition in which a user-specified length of time has passed, the user-specified length of time being measured from a point in time at which the at least one vehicle vent was last closed.

8. The method of claim 7 further comprising the step of, prior to autonomously controlling operation of the vehicle to open the at least one vehicle vent, detecting a manual closing of the at least one vehicle vent at the point in time.

9. The method of claim 7 further comprising the step of, prior to autonomously controlling operation of the vehicle to open the at least one vehicle vent, autonomously closing the at least one vehicle vent at the point in time.

10. The method of claim 7 wherein the user-specified vent opening condition is a regular opening condition.

* * * * *